United States Patent
Haimzon et al.

(10) Patent No.: US 11,200,193 B2
(45) Date of Patent: Dec. 14, 2021

(54) TRANSFERRING DATA BETWEEN SOLID STATE DRIVES (SSDS) VIA A CONNECTION BETWEEN THE SSDS

(71) Applicant: Marvell Israel (M.I.S.L) Ltd., Yokneam (IL)

(72) Inventors: Avi Haimzon, Nes Ziona (IL); Timor Kardashov, Kyriat Ono (IL); Noam Mizrahi, Modi'in (IL)

(73) Assignee: Marvell Asia Pte, Ltd., Singapore (SG)

(*) Notice: Subject to any disclaimer, the term of this patent is extended or adjusted under 35 U.S.C. 154(b) by 0 days.

(21) Appl. No.: 16/820,308

(22) Filed: Mar. 16, 2020

(65) Prior Publication Data
US 2020/0293483 A1    Sep. 17, 2020

Related U.S. Application Data

(60) Provisional application No. 62/818,566, filed on Mar. 14, 2019.

(51) Int. Cl.
*G06F 13/42* (2006.01)
*G06F 3/06* (2006.01)
(Continued)

(52) U.S. Cl.
CPC ........ *G06F 13/4221* (2013.01); *G06F 3/0604* (2013.01); *G06F 3/0646* (2013.01);
(Continued)

(58) Field of Classification Search
CPC .. G06F 13/4221; G06F 3/0604; G06F 3/0646; G06F 3/0688; G06F 2213/0026;
(Continued)

(56) References Cited

U.S. PATENT DOCUMENTS 9,313,128 B2    4/2016  Morimoto
9,785,355 B2 *  10/2017 Huang ................ H04L 67/1004
(Continued)

FOREIGN PATENT DOCUMENTS

| WO | WO-2016/182756 | 11/2016 |
| WO | WO-2018/217316 | 11/2018 |

OTHER PUBLICATIONS

Hoff, Brandon, "Checklist for What's New in NVMeTM over Fabrics," website, NVM Express, retrieved from https://nvmexpress.org/checklist-for-whats-new-in-nvme-over-fabrics/ on Sep. 24, 2020, 3 pages (Oct. 29, 2018).

(Continued)

*Primary Examiner* — Idriss N Alrobaye
*Assistant Examiner* — Henry W Yu

(57) ABSTRACT

A first solid state drive (SSD) includes a first built-in network interface device configured to communicate via a network fabric, and a second SSD includes a second built-in network interface device configured to communicate via the network fabric. A connection is opened between the first SSD and the second SSD over the network fabric. Based on a non-volatile memory over fabric (NVMe-oF) communication protocol, an NVMe command to transfer data between the first SSD and the second SSD over the connection is encapsulated in a capsule. The capsule is sent from the first SSD to the second SSD over the connection via the network fabric. The second SSD executes the NVMe command in the capsule to transfer the data between the first SSD and the second SSD over the connection.

22 Claims, 5 Drawing Sheets

(51) Int. Cl.
*H04L 12/06* (2006.01)
*H04L 12/46* (2006.01)
*H04L 12/931* (2013.01)
*H04L 29/08* (2006.01)

(52) U.S. Cl.
CPC ............ *G06F 3/0688* (2013.01); *H04L 12/06* (2013.01); *H04L 12/4633* (2013.01); *H04L 49/351* (2013.01); *H04L 49/357* (2013.01); *H04L 49/358* (2013.01); *G06F 2213/0026* (2013.01)

(58) Field of Classification Search
CPC ... H04L 12/06; H04L 12/4633; H04L 49/351; H04L 49/357; H04L 49/358; H04L 67/1097
See application file for complete search history.

(56) References Cited

U.S. PATENT DOCUMENTS

| | | | |
|---|---|---|---|
| 10,162,793 B1 | 12/2018 | Bshara et al. | |
| 10,423,358 B1 | 9/2019 | Foo | |
| 10,671,302 B1* | 6/2020 | Aggarwal | ............. G06F 3/0613 |
| 10,691,368 B2 | 6/2020 | Kachare et al. | |
| 2005/0243818 A1 | 11/2005 | Foglar et al. | |
| 2015/0006663 A1* | 1/2015 | Huang | .................... G06F 13/00 709/213 |
| 2016/0085718 A1* | 3/2016 | Huang | .................... H04L 29/08 709/213 |
| 2016/0127492 A1 | 5/2016 | Malwankar et al. | |
| 2016/0210062 A1 | 7/2016 | McCambridge et al. | |
| 2017/0149920 A1 | 5/2017 | Sammatshetti | |
| 2017/0286363 A1 | 10/2017 | Joshua et al. | |
| 2018/0046594 A1 | 2/2018 | Worley et al. | |
| 2018/0081565 A1* | 3/2018 | Tan | ....................... G06F 3/0659 |
| 2018/0101450 A1 | 4/2018 | Park et al. | |
| 2018/0107591 A1 | 4/2018 | Smith | |
| 2018/0284989 A1 | 10/2018 | Kachare et al. | |
| 2018/0284990 A1 | 10/2018 | Kachare et al. | |
| 2018/0285019 A1* | 10/2018 | Olarig | ................... H04L 49/357 |
| 2018/0321876 A1 | 11/2018 | Ballapuram et al. | |
| 2019/0107956 A1 | 4/2019 | Kachare et al. | |
| 2019/0163364 A1 | 5/2019 | Gibb et al. | |
| 2019/0250855 A1* | 8/2019 | Kachare | .................. G06F 3/061 |
| 2019/0272123 A1* | 9/2019 | Gissin | ..................... G06F 13/28 |
| 2019/0317901 A1 | 10/2019 | Kachare et al. | |
| 2020/0125157 A1 | 4/2020 | Kachare et al. | |
| 2020/0225863 A1 | 7/2020 | Veluswamy et al. | |
| 2020/0225874 A1 | 7/2020 | Nimmagadda et al. | |

OTHER PUBLICATIONS

U.S. Appl. No. 16/717,408, Noam Mizrahi, "Solid-State Drive with Initiator Mode," filed Dec. 17, 2019.
U.S. Appl. No. 16/817,846, Noam Mizrahi, "Solid-State Drive with Inhibitor Mode," filed Mar. 13, 2020.
U.S. Appl. No. 16/820,320, Shahar Noy et al., "Ethernet Enabled Solid State Drive (SSD)," filed Mar. 16, 2020.
International Search Report and Written Opinion in International Patent Application No. PCT/IB2020/052403, dated Jun. 8, 2020.

* cited by examiner

TRANSFERRING DATA BETWEEN SOLID STATE DRIVES (SSDS) VIA A CONNECTION BETWEEN THE SSDS

CROSS REFERENCE TO RELATED APPLICATION

This disclosure claims the benefit of priority of U.S. Provisional Application No. 62/818,566, filed Mar. 14, 2019, entitled, "PEER-TO-PEER NVMe-oF SSD COMMUNICATION OVER FABRIC WITHOUT HOST/COMPUTE", the contents of which are incorporated herein by reference in its entirety.

FIELD OF THE DISCLOSURE

This disclosure relates to storage services, namely transferring data between solid state drives (SSDs) having built-in network interface devices via a connection between the SSDs over a network fabric.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A host computer ("host") communicates with a solid state drive (SSD) to obtain data services provided by the SSD, such as reading data, storing data, and erasing data. The solid-state drive (SSD) is a data storage device that uses non-volatile memory, such as NAND (Not-And) non-volatile memory, to store persistent digitally encoded data. The SSD may be configured to emulate a hard disk drive, i.e., a device that stores persistent digitally encoded data on magnetic surfaces of rapidly rotating platters and replaces a hard disk drive (HDD) in many applications. The SSD includes an interface, a compute, an aggregator, and one or more non-volatile memory. The interface enables communication with the host computer through a network, which may include one or more intermediary devices, such as one or more interface switches and/or routers, coupled through wired and/or wireless interconnections. The compute is a processor that coordinates operations on the SSD and the aggregator provides a peripheral component interconnect express (PCIe) connection to the one or more non-volatile memory.

The host sends a command to the SSD over the network to obtain the data services. The command is received at the interface and based on the command, the compute accesses the non-volatile memory of the SSD over the PCIe connection of the aggregator. The command from the host conforms with a Non-Volatile Memory Express over Fabric (NVME-oF) protocol associated with access of an SSD over a network. The compute accesses the non-volatile memory via a NVMe protocol which defines a command set for access of the non-volatile memory via the PCIe connection. The host also facilitates transfer of the data from one SSD to another SSD. To transfer the data between SSDs, the host sends one or more commands to the SSD over the network to cause the compute to provide data stored on one SSD to the host. Then, the host sends one or more commands to the SSD to cause the data on the host to be stored in another SSD. The transfer of the data from one SSD to the other SSD via the host generates data traffic over the network between the host and the SSD.

SUMMARY

This disclosure relates to solid state memory devices (SSDs), namely transferring data between SSDs with respective built-in network interface devices. The SSDs with respective built-in network interface devices are coupled together by a network fabric, and data is transferred between the SSDs over a connection between SSDs and via the network fabric rather than transferring the data via a host as an intermediary.

In an embodiment, a method is for transferring data between a first solid state drive (SSD) and a second SSD, the first SSD having a first built-in network interface device configured to communicate via a network fabric, and the second SSD having a second built-in network interface device configured to communicate via the network fabric. The method includes: opening a connection between the first SSD and the second SSD over a network fabric; based on a non-volatile memory over fabric (NVMe-oF) communication protocol, encapsulating in a capsule an NVMe command to transfer data between the first SSD and the second SSD over the connection; sending the capsule from the first SSD to the second SSD over the connection via the network fabric; and executing, by the second SSD, the NVMe command in the capsule to transfer the data between the first SSD and the second SSD over the connection.

Figure 1:
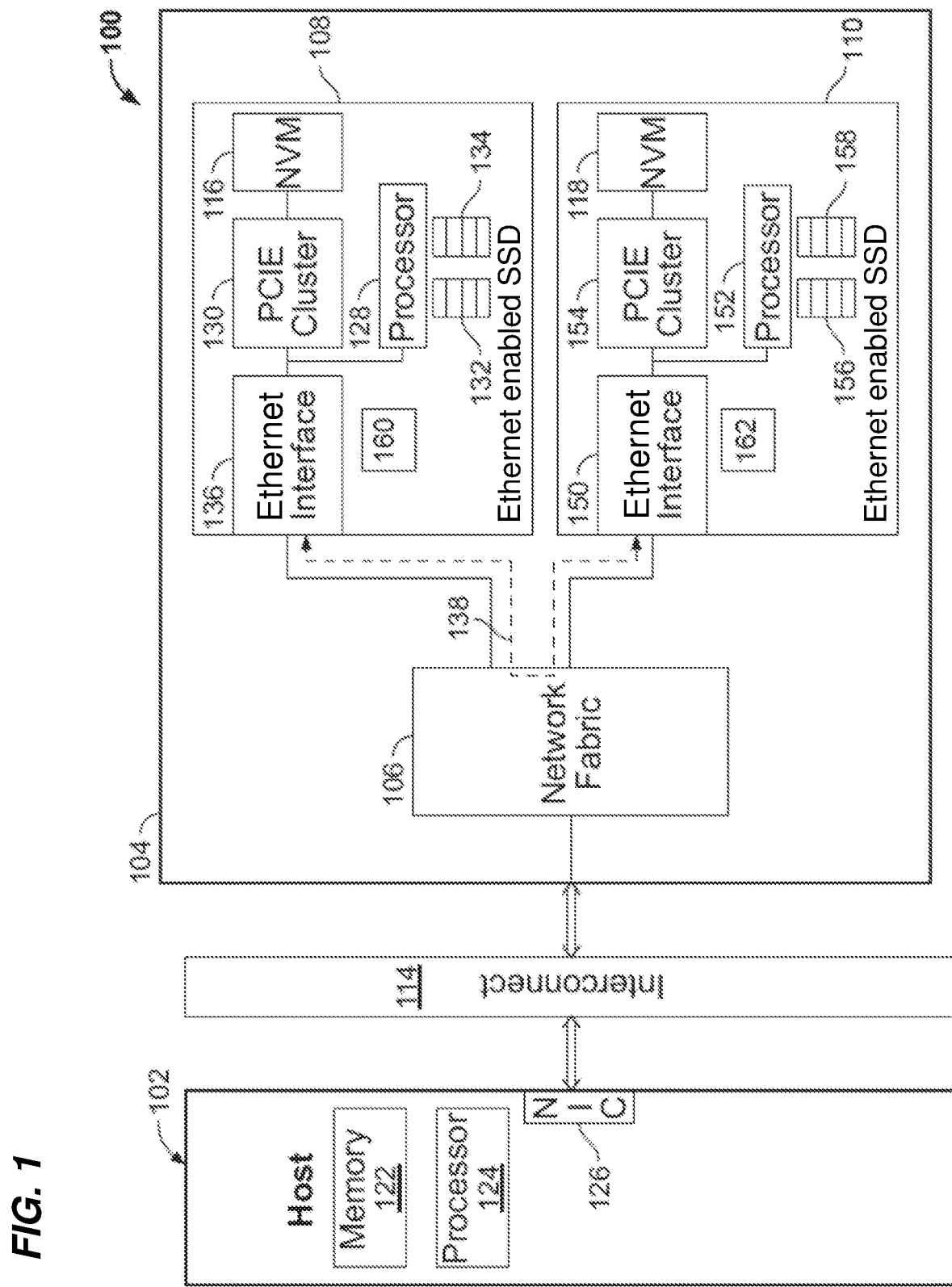
FIG. 1 is a diagram of an example storage system which facilitates transfer of data between solid state drives (SSDs) with respective built-in network interface devices, the transfer of data occurring over a connection between the SSDs, the connection via a network fabric, according to an embodiment.

The drawings are for the purpose of illustrating example embodiments, but it is understood that the embodiments are not limited to the arrangements and instrumentality shown in the drawings.

DETAILED DESCRIPTION

This disclosure relates to storage services, and in particular to transferring data between solid state drives (SSDs) via a connection between the SSDs that does not include a host processor, e.g., data is transferred between SSDs without having to transfer the data from one SSD to the host processor and then to transfer the data from the host processor to another SSD. In an embodiment, the SSDs include respective built-in network interface devices (e.g., an Ethernet network interface device, a Fibre Channel network interface device, an InfiniB and network interface device, etc.). The SSDs with respective built-in network interface devices are storage devices, e.g., SSDs, capable of peer-to-peer communications, and which communicate via a communication protocol (e.g., the non-volatile memory over fabric (NVMe-oF) protocol or another suitable communication protocol) that is designed for controlling (or communicating with) with non-volatile memory devices such as SSDs. The SSDs described herein communicate over a connection between the SSDs, according to various embodiments. The SSDs described herein communicate according to one or more suitable communication protocols such as one or more of: Fibre Channel, InfiniB and, Fibre Channel over Ethernet (FCoE), Remote Direct Memory Access (RDMA), RDMA over Converged Ethernet (RoCE), RDMA over the User Data Protocol (UDP) as a transport layer, iWARP (a networking protocol that implements RDMA over the Transmission Control Protocol (TCP) and the Internet Protocol (IP) (TCP/IP)), the non-volatile memory express (NVMe) over TCP as a transport layer, etc., or other suitable communication protocols for exchanging data with storage subsystems over a network fabric such as an Ethernet fabric, a Fibre Channel fabric, an InfiniB and fabric, etc., according to various embodiments. The examples of systems, apparatus, methods and techniques as described herein transfer data between SSDs with respective built-in network interface devices via the connection between the SSDs without having to transfer the data from one SSD to a host and then to transfer the data from the host to another SSD, thus reducing an amount of data transferred between the SSDs and the host and/or reducing processing by the host.

The NVMe-oF protocol is related to the NVM Express (NVMe) protocol. NVMe defines a register level interface for communication between a host and a non-volatile memory subsystem over a PCI Express (PCIe) bus. NVMe-oF builds on architecture, command sets, and queuing interface defined by NVMe and is a protocol which supports NVMe access to an SSD over a network fabric. While both NVMe and NVMe-oF have similar features, such as the use of a set of commands to control the operations of the storage devices as requested by the host, one of the main distinctions between NVMe and NVMe-oF is the transport-mapping mechanism for sending and receiving commands and responses being communicated between the devices. NVMe-oF uses a message-based model for communications between a host and an SSD, where local NVMe communications include mapping commands and responses to shared memory in the host over a PCIe interface protocol. NVMe-oF enables the use of alternate transports to PCIe, wherein these alternate transports extend the distances across which a host and SSD connects. Greater storage system throughput has been enabled through use of NVMe-oF technologies.

Embodiments described below utilize SSDs with built-in Ethernet interface devices (sometimes referred to herein as Ethernet-enabled SSDs). The embodiments with Ethernet-enabled SSDs are merely illustrative examples of SSDs with built-in network interface devices. Other embodiments, however, employ SSDs with other types of built-in network interface devices, such as Fibre Channel network interface devices, InfiniBand network interface devices, etc.

In some embodiments, an SSD with a built-in network interface device is enclosed (at least partially) in an housing having a suitable form factor, such as a standard hard disk drive (HDD)/SSD form factor, such as a 3.5-inch form factor, a 2.5-inch form factor, or a 1.8-inch form factor. The housing may incorporate (or define an aperture that accommodates) a physical network interface connector appropriate for the network interface device. For example, if the built-in network interface device comprises an Ethernet interface device, the housing may incorporate or (or define an aperture that accommodates) a suitable physical Ethernet connector (e.g., an RJ45 connector), according to an embodiment. As another example, if the built-in network interface device comprises a Fibre Channel (FC) interface device, the housing may incorporate (or define an aperture that accommodates) a suitable physical FC connector, according to another embodiment. As another example, if the built-in network interface device comprises an InfiniBand interface device, the housing may incorporate (or define an aperture that accommodates) a suitable physical InfiniBand connector (e.g., a QSFP connector, a CXP connector, MPO connectors, etc.), according to another embodiment.

In other embodiments, the SSD with the built-in network interface device is not enclosed in a housing.

In some embodiments, SSDs with built-in network interface devices describe herein have a structure such as disclosed in U.S. patent application Ser. No. 16/820,320, filed on the same day as the present application, entitled "Ethernet Enabled Solid State Drive (SSD)," which is incorporated by reference herein in its entirety. In other embodiments, SSDs with built-in network interface devices have different suitable structures.

FIG. 1 is a diagram of an example storage system 100 that is enabled to transfer data between Ethernet enabled SSDs via a connection between the Ethernet enabled SSDs that does not include a host, according to an embodiment. The example storage system 100 comprises a host 102 coupled to an interconnect 114 which in turn is coupled to a storage sub-system 104 having a network fabric 106 and two Ethernet enabled SSD shown as Ethernet enabled SSD 108 and Ethernet enabled SSD 110. The interconnect 114 may be a network such as a local area network (LAN) or wide area network (WAN) between the host 102 and the storage sub-system 104. The interconnect 114 may include one or more intermediary devices, such as one or more interface switches and/or routers, coupled through wired and/or wireless interconnections. In examples, the storage sub-system 104 may provide connectivity among the network fabric 106, the Ethernet enabled SSDs 108, and Ethernet enabled SSD 110, and one more of the storage sub-system 104 and the host 102 may be located in a data center rack, according to an embodiment. The rack may have multiple mounting slots called bays, each designed to hold a hardware unit such as the host 102 or storage sub-system 104. In some examples, the rack may include a top-of-rack switch which provides connectivity between the hardware units and a remote network. In other examples, the interconnect 114 comprises a backplane of the rack. Further, more than one storage sub-system 104 and more than one host 102 may be coupled to the interconnect 114. The other storage systems may be part of a first rack where storage sub-system 104 is located or in a second rack. Similarly, a second host may be part of a first rack and the host 102 is located or in a second rack.

The host 102 includes any type of host, such as a computer processor or a network of computers and processors. Further, the host 102 is not necessarily limited to a single host device, and may represent a plurality of host devices. In an embodiment, the host 102 includes a memory 122 in the form of dynamic random access memory (DRAM), a processor 124, such as a central processing unit (CPU), and a network interface card (NIC) 126. The memory 122 may store data only when powered and the processor 124 may be implemented on one or more integrated circuits, and the processor 124 is configured to execute machine readable instructions stored in the memory 122 (or another memory (not shown)) to perform arithmetical, logical, input/output (I/O) and other operations. The host 102 may or may not have limited memory to store data when the memory is not powered, e.g., non-volatile memory. To facilitate storage of data in non-volatile memory of the storage sub-system 104, the host 102 utilizes the NIC 126 to access the non-volatile memory of the storage sub-system 104. The NIC 126 may facilitate transferring the data over the interconnect 114 between the host 102 and the storage sub-system 104. In an embodiment, the NIC 126 comprises an Ethernet network interface device.

The storage sub-system 104 comprises an Ethernet enabled SSD 108 and an Ethernet enabled SSD 110. The Ethernet enabled SSD 108/110 comprises a data storage device that uses non-volatile memory, such as NAND (Not-And) non-volatile memory, a Flash memory, etc., to store digitally encoded data persistently. The Ethernet enabled SSD 108/110 may be configured to emulate a hard disk drive (HDD. Ethernet enabled SSD 108 and Ethernet enabled SSD 110 may store data in respective non-volatile memories (NVM) 116, 118. In examples, Ethernet enabled SSD 108 may be configured with a processor 128, an aggregator such as a PCI Express (PCIe) cluster 130, and the one or more non-volatile memories 116. In an embodiment, the processor 128 is configured to execute machine readable instructions stored in a memory (not shown) to perform arithmetical, logical, I/O, and other operations. In another embodiment, the processor 128 additionally or alternatively comprises a hardware processor (e.g., including one or more hardware state machines) that includes hardware circuitry configured to perform arithmetical, logical, I/O, and other operations. The PCIe cluster 130 provides a PCIe connection to the one or more non-volatile memories 116. The processor 128 accesses the non-volatile memory 116 over a PCIe connection of the PCIe cluster 130 using the NVMe protocol, for example, or another suitable protocol. NVMe protocol defines a command set for access of the data stored on the non-volatile memory 116 over the PCIe connection of the PCIe cluster 130 to the non-volatile memory 116. In other embodiments, the NVM 116 of the Ethernet enabled SSD 108 is accessed via another suitable bus/connection such as a Fibre Channel network, a serial AT attachment (SATA) bus, a serial attached small computer system interface (SCSI) (SAS) connection, etc.

The Ethernet enabled SSD 108 may be further configured to implement the NVMe-oF protocol. NVMe-oF builds on architecture, command sets, and queuing interface defined by NVMe and supports NVMe access of the Ethernet enabled SSD 108 over the network fabric 106 using FCoE, RDMA, InfiniBand, iWARP, RoCEv2, NVMeTCP which specifies NVMe protocol over TCP, etc., in various embodiments. To support this access, the Ethernet enabled SSD 108 includes an Ethernet interface device 136 that is configured to communicate over the network fabric 106 according to an Ethernet protocol. Additionally, the processor 128 is configured to implement one or more protocols such as NVMe, SATA, SAS, FCoE, RDMA, InfiniBand, iWARP, RoCE, NVMeTCP, etc., according to various embodiments. In an embodiment, the Ethernet enabled SSD 108 includes a submission queue 132 and a completion queue 134. The submission queue 132 and the completion queue 134 are shown as separate from the processor 128, but in other examples, the submission queue 132 and the completion queue 134 may be integrated into the processor 128. The submission queue 132 and the completion queue 134 may each be associated with unidirectional communication channels. The submission queue 132 may facilitate sending units of information referred to herein as "capsules" to another Ethernet enabled SSD such as Ethernet enabled SSD 110, and the completion queue 134 may facilitate receiving capsules from the other Ethernet enabled SSD such as Ethernet enabled SSD 110. The capsule is a unit of information exchange associated with NVMe-oF and which may include an NVMe command, a response to an NVMe command, data, and/or scatter gather lists (SGLs).

Ethernet enabled SSD 110 may have components the same as or similar to that shown and described with respect to Ethernet enabled SSD 108. For example, Ethernet enabled SSD 110 may have a respective Ethernet interface device 150, a processor 152, a PCIe cluster 154, an NVM 118, a submission queue 156, and a completion queue 158. In other examples, the Ethernet enabled SSD 110 may include other components and/or may omit components as compared to the Ethernet enabled SSD 108. Further, in other examples, the storage sub-system 104 may have more or less Ethernet enabled SSDs than illustrated in FIG. 1.

A connection between the host 102 and an Ethernet enabled SSD may allow the host 102 to access data stored on an Ethernet enabled SSD. The connection may also enable transfer of data from one SSD to the memory 122 of the host 102 and then from the memory 122 of the host 102 to a second SSD. Instead of the host 102 facilitating the transfer of data between SSDs, the Ethernet enabled SSDs 108, 110 are configured to perform the transfer of data between each other without first transferring the data to the host 102. The transfer of data is performed via a connection 138 between Ethernet enabled SSDs 108 and Ethernet enabled SSD 110 rather than a connection between the Ethernet enabled SSD 108 or Ethernet enabled SSD 110 and the host 102. The transfer of data includes transferring data from Ethernet enabled SSD 108 to Ethernet enabled SSD 110 over the connection 138, which connects Ethernet enabled SSDs 108 and Ethernet enabled SSD 110 without transferring the data to the memory 122 of the host 102 as an intermediate operation, thus reducing an amount of data transferred between the Ethernet enabled SSDs 108/110 and the host 102 over the interconnect 114 and/or processing by the host 102.

As an illustrative example, the first Ethernet enabled SSD 108 may copy data to the second Ethernet enabled SSD 110. The non-volatile memory 116 may be addressable memory and the data to be copied may be located in a range of addresses in the non-volatile memory 116 of the first Ethernet enabled SSD 108. The first Ethernet enabled SSD 108 may open a connection 138 to the second Ethernet enabled SSD 110 over the network fabric 106. The connection 138 may be an NVMe-oF transport layer connection based on Fibre Channel, as an illustrative example. Alternatively, the connection 138 may be based on RDMA, InfiniBand, RoCEv2, iWARP, NVMeTCP, or another suitable protocol. The connection 138 may be opened prior to transfer of the data between the Ethernet enabled SSDs. The connection 138 may establish one or more queues such as the queues 132, 134 and queues 156, 158 to facilitate the subsequent transfer of the data between the Ethernet enabled SSD 108 and Ethernet enabled SSD 110 over the connection 138.

The processor 128 of the first Ethernet enabled SSD 108 may send a capsule over the connection 138 in the network fabric 106 to the second Ethernet enabled SSD 110 by placing the capsule in the submission queue 132. The capsule to be sent to the second Ethernet enabled SSD 110 may contain commands such as an NVMe write command, data from the NVM 116 to be copied to the second Ethernet enabled SSD 110, SGLs which indicate network addresses of data in non-volatile memory 116 to be copied, etc. The processor 128 generates an Ethernet packet that includes the capsule, and provides the Ethernet packet to the Ethernet interface device 136. The Ethernet interface device 136 transmits the Ethernet packet to the network fabric 106.

The Ethernet interface device 150 of the second Ethernet enabled SSD 110 receives the Ethernet packet from the network fabric 106 and provides the Ethernet packet to the processor 152. The processor 152 retrieves the capsule from the Ethernet packet and stores the capsule in the submission queue 156. Subsequently, the processor 158 retrieves the capsule from the submission queue 156 and, in response to a command in the capsule, copies the data from the first Ethernet enabled SSD 108 to the NVM 118 of the second Ethernet enabled SSD 110. The data to be copied may be included in the capsule or the second Ethernet enabled SSD 110 may use SGL information in the capsule to subsequently request data identified by the SGL from the first Ethernet enabled SSD 110 over the connection 138 and, upon receiving the requested data via the connection 138, copy the requested data to the NVM 118. The data may be copied without the data retrieved from the first Ethernet enabled SSD 108 having to be copied to the host 102 over the interconnect 114 and the host 102 having to copy the data to second Ethernet enabled SSD 110 over the interconnect 114. In some examples, the second Ethernet enabled SSD 110 may send an NVMe response to the NVMe command over the connection 138 to indicate a completion of the copy by placing a capsule with the NVMe response in the completion queue 158. The processor 152 generates an Ethernet packet that includes the capsule, and provides the Ethernet packet to the Ethernet interface device 150. The Ethernet interface device 150 transmits the Ethernet packet to the network fabric 106.

The Ethernet interface device 136 of the second Ethernet enabled SSD 110 receives the Ethernet packet from the network fabric 106 and provides the Ethernet packet to the processor 128. The processor 128 retrieves the capsule from the Ethernet packet and stores the capsule in the completion queue 134. Subsequently, the processor 128 retrieves the capsule from the completion queue 134 and, in response to the NVMe response in the capsule, determines that copying of the data from the first Ethernet enabled SSD 108 to the NVM 118 of the second Ethernet enabled SSD 110 has been completed.

In examples, the first Ethernet enabled SSD 108 and the second Ethernet enabled SSD 110 may have an addressable local random access memory (RAM) such as dynamic RAM (DRAM) 160 and DRAM 162 to facilitate the copy of data. For instance, the first Ethernet enabled SSD 108 may copy data from the NVM 116 into its DRAM 160 as part of the copy command. A local address in the DRAM 160 where the data was copied to may be stored in the capsule with the write command. The capsule may be placed in the submission queue 132. Then, when the capsule is received by the second Ethernet enabled SSD 110, the second Ethernet enabled SSD 110 may fetch the data from the DRAM 160 of the first Ethernet enabled SSD 108 based on the local address for storage in the DRAM 160. The second Ethernet enabled SSD 110 may then store the data in the DRAM 162 to the NVM 118 via the PCIe connection in accordance with NVMe to complete the copy of the data. The DRAM 160 and the DRAM 162 may facilitate the copy when the NVM 116 cannot be directly accessed by the second Ethernet enabled SSD 110.

According to an embodiment, the copy operation may be executed to form a redundant array of independent disks (RAID) where each Ethernet enabled SSD corresponds to a "disk" of the RAID and each Ethernet enabled SSD has a copy of the same data. For example, the host 102 may first copy data to one Ethernet enabled SSD. Then, the one Ethernet enabled SSD may copy the data to another Ethernet enabled SSDs over the connection 138 to form the RAID. In examples, the copying may be further repeated one or more times between additional Ethernet enabled SSDs to form additional Ethernet enabled SSDs with copies of the data.

Other data operations may include retrieving data from one Ethernet enabled SSD and storing in another Ethernet enabled SSD via the connection 138 between Ethernet enabled SSDs in the storage sub-system 104. For example, the first Ethernet enabled SSD 108 may send a capsule over the connection 138 through the network fabric 106 to the second Ethernet enabled SSD 110 by placing the capsule in the submission queue 132. The capsule sent to the second Ethernet enabled SSD 110 may contain an NVMe read command and an indication of the data to read from the non-volatile memory 118 of the second Ethernet enabled SSD 110, such as SGLs which indicate network addresses of data in the non-volatile memory 118 to retrieve. The processor 128 generates an Ethernet packet that includes the capsule, and provides the Ethernet packet to the Ethernet interface device 136. The Ethernet interface device 136 transmits the Ethernet packet to the network fabric 106.

The Ethernet interface device 150 of the second Ethernet enabled SSD 110 receives the Ethernet packet from the network fabric 106 and provides the Ethernet packet to the processor 152. The processor 152 retrieves the capsule from the Ethernet packet and stores the capsule in the submission queue 156. In response to the capsule in the submission queue 156, the second Ethernet enabled SSD 110 provides the data to the first Ethernet enabled SSD 108 also over the connection 138. The second Ethernet enabled SSD 110 may send an NVMe response with the data to the first Ethernet enabled SSD 108 by placing the NVMe response in a capsule and placing the capsule with the NVMe response in the completion queue 158. The processor 152 generates an Ethernet packet that includes the capsule, and provides the Ethernet packet to the Ethernet interface device 150. The Ethernet interface device 150 transmits the Ethernet packet to the network fabric 106. The NVMe-oF response may be sent over the connection 138 to the completion queue 134 of the Ethernet enabled SSD 108.

In examples, the DRAM 160 and the DRAM 162 may facilitate the retrieval by the first Ethernet enabled SSD 108 of data in the NVM 118 of the second Ethernet enabled SSD 110. A local address in the DRAM 160 where the second Ethernet enabled SSD 110 is to write the retrieved data may be stored in the capsule with the read command. The capsule may be placed in the submission queue 132. Then, when the capsule is received by the second Ethernet enabled SSD 110, the second Ethernet enabled SSD 110 may read the data that is to retrieved from the NVM 118 based on an SGL in the capsule, and store the data in the DRAM 162. Then, the second Ethernet enabled SSD 110 may write the data to be retrieved to the DRAM 160 based on the local address in the capsule. The first Ethernet enabled SSD 108 may then write the data in the DRAM 160 to the NVM 116 via the PCIe connection in accordance with NVMe to complete the read command. The DRAM 160 and DRAM 162 may facilitate the retrieval when the NVM 118 cannot be directly accessed by the first Ethernet enabled SSD 108.

The retrieval operation may be used to build data in one Ethernet enabled SSD based on data in another Ethernet enabled SSD, for instance, if a data on a "disk" of the RAID is corrupted. An Ethernet enabled SSD may retrieve data from another Ethernet enabled SSD so that it has a same copy of the data on the other Ethernet enabled SSD.

Figure 2:
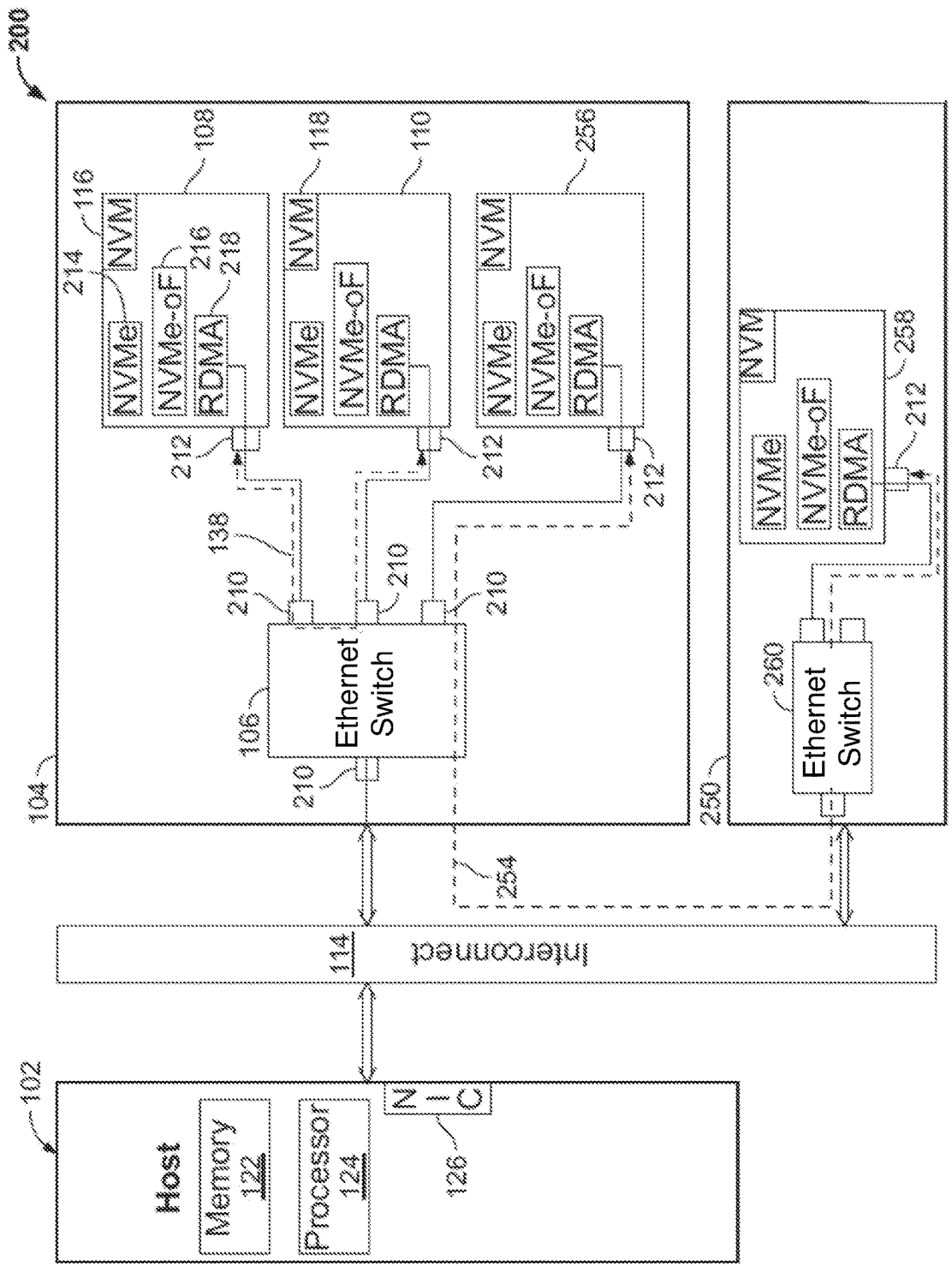
FIG. 2 is a diagram of another example storage system, according to another embodiment.

FIG. 2 is a block diagram of another example of storage system 200, according to another embodiment. The storage system 200 includes the Ethernet enabled SSDs 108 and 110 of FIG. 1. The processor 128 of the Ethernet enabled SSD 108 executes communication protocol layers 214, 216, 218 to facilitate the transfer of the data between Ethernet enabled SSDs over a connection between the Ethernet enabled SSDs. In an embodiment, the communication protocol layers 214, 216, 218 are implemented using software executed by the processor 128. In another embodiment, at least a portion of the communication protocol layers 214, 216, 218 are implemented using hardware circuitry, such as one or more hardware state machines.

The storage system 200 includes components of the example storage system 100 in FIG. 1 which are not shown in storage system 200 for simplicity. The example storage system 200 includes host 102, interconnect 114, storage systems 104, 250, Ethernet switches 106, 260, and Ethernet enabled SSDs which are shown as Ethernet enabled SSD 108, Ethernet enabled SSD 110, Ethernet enabled SSD 256, and Ethernet enabled SSD 258.

The Ethernet switch 106 includes one or more network ports 210. The one or more of the network ports 210 may be a physical interface which enables communication between Ethernet enabled SSDs or between an Ethernet enabled SSD and the host 102. Further, Ethernet enabled SSD 108, Ethernet enabled SSD 110, Ethernet enabled SSD 256, and Ethernet enabled SSD 258 may have one or more network ports 212 to enable communication with the Ethernet switch 106.

Ethernet enabled SSD 108 may also be configured with one or more communication protocol layers associated with access to data stored on the Ethernet enabled SSDs. For example, Ethernet enabled SSD 108 may have an NVMe layer 214, an NVMe-oF layer 216, and an RDMA layer 218. The NVMe layer 214 may be a protocol layer that defines an architecture, command sets, and a queuing interface to access the data stored in the non-volatile memory 116 over the PCIe cluster 130. The NVMe-oF layer 216 may be a protocol layer that defines extensions to the NVMe layer 214 for access to an SSD over the Ethernet switch 106. The RDMA layer 218 may be a transport protocol layer that provides reliable delivery of data, NVMe commands, and NVMe responses over the Ethernet switch 106. The RDMA layer 218 facilitates direct memory access (DMA) operations on the data, SGL, commands, and responses to be delivered, reducing latency in delivery compared to delivery via an application stack. The RDMA layer 218 may take the form of RDMA over Converged Ethernet v2 (e.g., RoCEv2) to enable the RDMA over Ethernet, InfiniBand, or iWARP, according to various embodiments. In some embodiments, functionality of the NVMe-oF layer 216 and the RDMA layer 218 may be configured as a single layer. In some embodiments, the RDMA layer 218 is integrated within the NVMe-oF layer 216.

Ethernet enabled SSD 110, Ethernet enabled SSD 256, and Ethernet enabled SSD 258 may have components similar to that shown and described with respect to Ethernet enabled SSD 108 in FIGS. 1 and 2. For example, the Ethernet enabled SSD 110, Ethernet enabled SSD 256, and Ethernet enabled SSD 258 may have a respective NVMe layer, NVMe-oF layer, and RDMA layer. In other examples, the Ethernet enabled SSD 110, Ethernet enabled SSD 256, and Ethernet enabled SSD 258 may have additional layers compared to Ethernet enabled SSD 108.

The various software layers in the Ethernet enabled SSD may be used to perform data operations between a first Ethernet enabled SSD 108 and a second Ethernet enabled SSD 110 such as copying data in the NVM 116 of the first Ethernet enabled SSD 108 to the NVM 118 of the second Ethernet enabled SSD 110 via the connection 138 between the first Ethernet enabled SSD and second Ethernet enabled SSD, reducing need to transfer data to the host 102 over the interconnect 114 as an intermediate step.

For example, the RDMA layer of the first Ethernet enabled SSD 108 and the RDMA layer of the second Ethernet enabled SSD 110 may open the connection 138 between the first Ethernet enabled SSD 108 and the second Ethernet enabled SSD 110. The respective RDMA layers may open the connection 138 based on a port identifier (ID) associated with the first Ethernet enabled SSD 108 and a port ID associated with the second Ethernet enabled SSD 110 which uniquely identifies the ports of the connection 138. An Ethernet enabled SSD port is a protocol interface between an Ethernet enabled SSD and the Ethernet switch 106 and a collection of one or more physical fabric interfaces that together act as a single protocol interface. An Ethernet enabled SSD may have one or more Ethernet enabled SSD ports. Each Ethernet enabled SSD port may have the port ID, which may be a 16 bit identifier. The Ethernet enabled SSD ports of an Ethernet enabled SSD may support different NVMe-oF transport connections. An Ethernet enabled SSD port may support multiple NVMe-oF transport connections if more than one NVMe-oF transport binding specifications exist for the underlying fabric (e.g., an Ethernet enabled SSD port identified by a port ID may support both iWARP and RoCEv2).

Each of the Ethernet enabled SSD 108 and Ethernet enabled SSD 110 may also have a network address which uniquely identifies the Ethernet enabled SSD in a network. The network address may be any logical or physical address, such as a media access control (MAC) address or an Internet Protocol (IP) address. The connection 138 may also be based on the network address of the Ethernet enabled SSD 108 and the network address of the Ethernet enabled SSD 110. The NVMe layer of the first Ethernet enabled SSD 108 may generate a command associated with the data operation which is then encapsulated in a capsule by the NVMe-oF layer 216 and placed in the submission queue of the Ethernet enabled SSD 108. The RDMA layer of the first Ethernet enabled SSD 108 may transport the capsule through its network port 212 and over connection 138 of the Ethernet switch 106 to the second Ethernet enabled SSD 110. The RDMA layer of the second Ethernet enabled SSD 110 layer may receive the capsule over the connection 138 via its network port 212. The NVMe-oF layer of the second Ethernet enabled SSD 110 may recover the NVMe command and provide the NVMe command to its NVMe layer to perform the data operation. Further, as discussed above, functionality of the NVMe-oF layer 216 and the RDMA layer 218 may be configured as a single layer. In various examples, the data operation may be to copy data in the NVM 116 of the first Ethernet enabled SSD 108 to the NVM 118 of the second Ethernet enabled SSD 110 or retrieve by the first Ethernet enabled SSD 108 data in the NVM 118 of the second Ethernet enabled SSD 110 and store the data in the NVM 116 of the first Ethernet enabled SSD 108. In some examples, the RDMA layer of the second Ethernet enabled SSD 110 may additionally send a NVMe response over the connection 138 also in a capsule to the first Ethernet enabled SSD 108. The sending of the response may be based on type and contents of the NVMe command as described above. The response may have been generated by the NVMe layer of the second Ethernet enabled SSD 110 and encapsulated by the NVMe-oF layer of the second Ethernet enabled SSD 110 into the capsule. The capsule may be then placed in the completion queue of the second Ethernet enabled SSD 110 for transmission by the RDMA layer of the second Ethernet enabled SSD 110 to the first Ethernet enabled SSD 108.

The connection 138 that described as being open between Ethernet enabled SSDs is exemplary in nature. The connection which is open to perform the data operation may take many forms depending on which Ethernet enabled SSDs are to transfer data. For example, Ethernet enabled SSDs 256 and Ethernet enabled SSD 258 on different storage systems 250, 104 may open a connection 254. The connection 254 may be over the Ethernet switch 106, the Ethernet switch 260, and the interconnect 114. Other variations are also possible.

Figure 3:
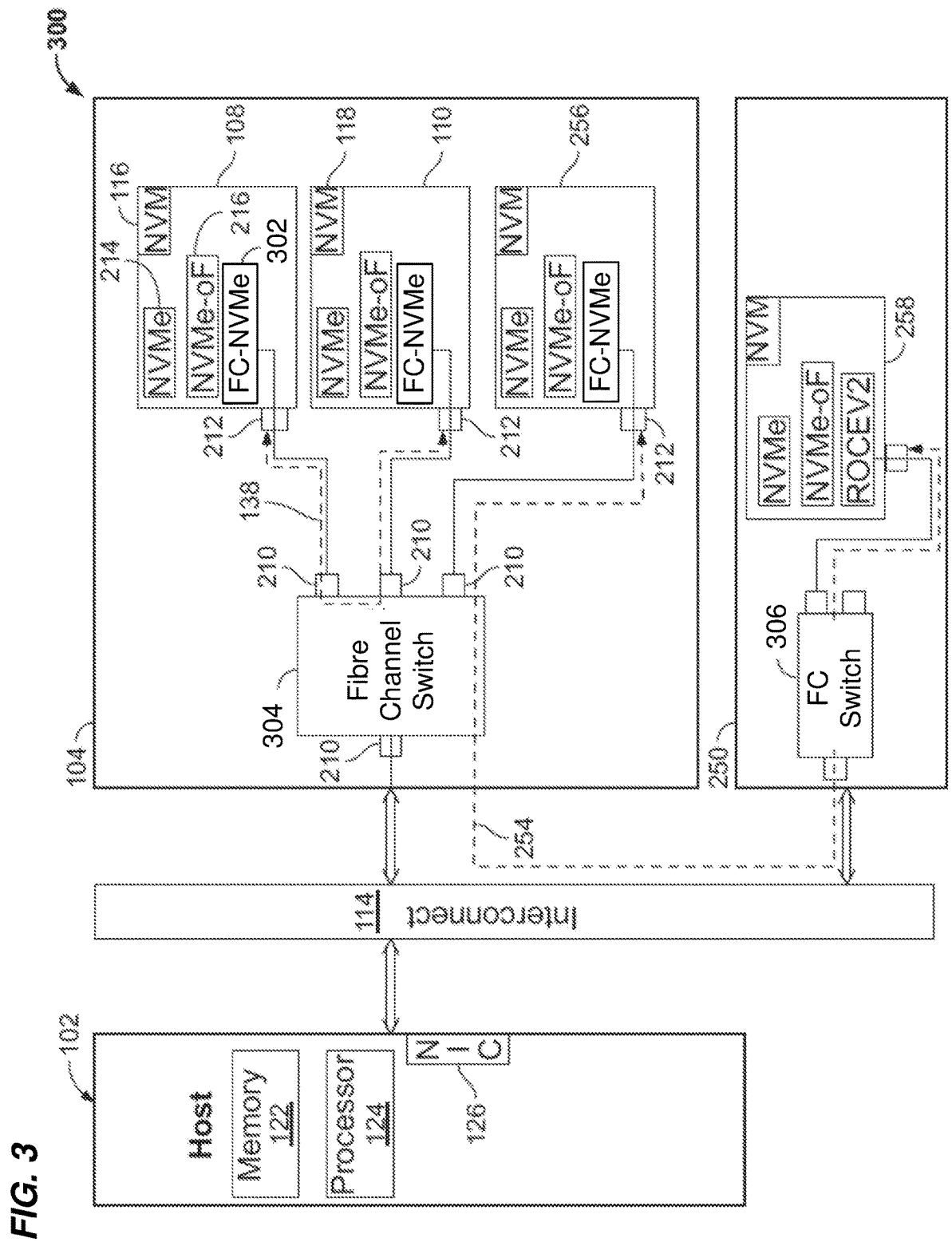
FIG. 3 is a diagram of yet another example storage system, according to yet another embodiment.

FIG. 3 is a block diagram of yet another example of storage system 300, according to another embodiment. The storage system 300 may include components of the example storage system 100 in FIG. 1 which are not shown in storage system 300 for simplicity. The storage system 200 includes the SSDs 108 and 110 of FIG. 1, where the SSDs 108 and 110 include respective Fibre Channel (FC) network interface devices rather than the Ethernet network interface devices 136, 150. In connection with FIG. 3, the SSDs 108 and 110 are sometimes referred to as FC enabled SSDs.

In the example of storage system 300, the network fabric 106 of the storage sub-system 104 comprises an FC switch 304, and the storage sub-system 250 comprises an FC switch 306.

The processor 128 of the FC enabled SSD 108 executes communication protocol layers 214, 216, 302 to facilitate the transfer of the data between FC enabled SSDs over a connection between the FC enabled SSDs. In an embodiment, the communication protocol layers 214, 216, 302 are implemented using software executed by the processor 128. In another embodiment, at least a portion of the communication protocol layers 214, 216, 302 are implemented using hardware circuitry, such as one or more hardware state machines.

The example storage system 300 includes the host 102, the interconnect 114, a storage sub-system 104, and FC enabled SSDs which are shown as FC enabled SSD 108, FC enabled SSD 110, FC enabled SSD 256, and FC enabled SSD 258.

FC enabled SSD 108 and similarly FC enabled SSD 110, FC enabled SSD 256, and FC enabled SSD 258 implement various communication protocol layers including the NVMe layer 214 and NVMe-oF layer 216. FC enabled SSD 108 and similarly FC enabled SSD 110, FC enabled SSD 256, and FC enabled SSD 258 also implement an NVMe-oF over Fibre Channel (FC-NVMe) layer that comprises a transport protocol layer that provides reliable delivery of data, NVMe commands, NVMe responses, SGLs, and/or data over the FC switch 304 and/or the FC switch 306. In some embodiments, functionality of the NVMe-oF layer 216 and the FC-NVMe layer 302 may be configured as a single layer. In some embodiments, the FC-NVMe layer 302 is integrated within the NVMe-oF layer 216. FC switches 304, 306 facilitate FC communications from one FC enabled SSD to another FC enabled SSD. Each of the network ports 210, 212 may be FC ports and each of the FC enabled SSDs may have unique network addresses such as unique FC addresses. The FC-NVMe layer 302 (or another suitable communication protocol layer) may establish a logical connection between a first FC enabled SSD 108 and a second FC enabled SSD 110 based on respective port IDs and/or network addresses to perform the data operations as described above, reducing need to transfer data to the host 102 from the first FC enabled SSD and then from the host to the second FC enabled SSD as an intermediate step. Connections 138 and 254 are illustrated, but the connection may take other forms as well.

Figure 4:
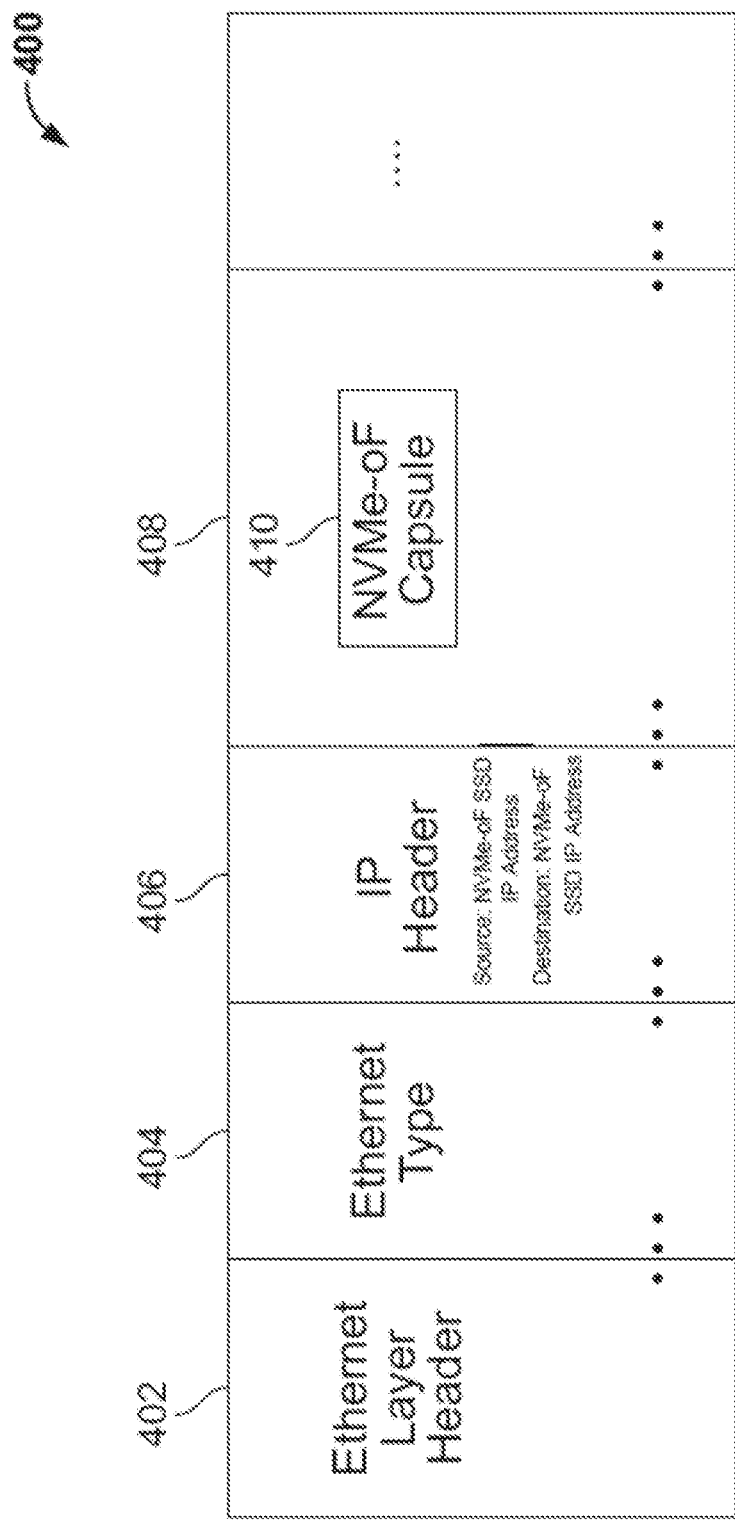
FIG. 4 is a diagram of an example Ethernet frame used for the transfer of data between SSDs over the connection between the SSDs in the example storage systems of FIGS. 1-3, according to some embodiments.

FIG. 4 is a diagram of an example Ethernet frame 400 associated with the transfer of data between a first Ethernet enabled SSD and a second Ethernet enabled SSD over an Ethernet connection and a network fabric that supports Ethernet, according to an embodiment. The frame 400 includes an Ethernet Layer 2 header 402 and an Ethernet type field 404 which indicate that the frame 400 is associated with Ethernet. In an embodiment, the header 402 includes a transmitter MAC address (e.g., a MAC address of an Ethernet enabled SSD that is transmitting the Ethernet frame 400) and a receiver MAC address (e.g., a MAC address of an Ethernet enabled SSD that is to receive the Ethernet frame 400). The example frame 400 may include an IP header 406 which indicates a source IP network address and a destination IP network address. The source IP network address may be an IP address of the Ethernet enabled SSD that transmitted the frame 400 and the destination IP network address may be an IP address of the Ethernet enabled SSD to where the frame 400 is to be sent. The MAC addresses and/or the IP network addresses may facilitate directing the frame from first Ethernet enabled SSD to the second Ethernet enabled SSD via the fabric 106/260 (FIGS. 1 and 2). The MAC addresses and/or the IP network addresses in the Ethernet frame 400 do not include a network address of the host 102, according to an embodiment. A payload 408 of the Ethernet frame 400 includes an NVMe-oF capsule 410 which includes NVMe commands, responses, SGLs etc. associated with the transfer of the data between the first Ethernet enabled SSD and the second Ethernet enabled SSD. The frame 400 may include other data as well such as port IDs associated with the connection between the Ethernet enabled SSDs to facilitate the routing of the frame from first Ethernet enabled SSD to the second Ethernet enabled SSD over the connection.

Figure 5:
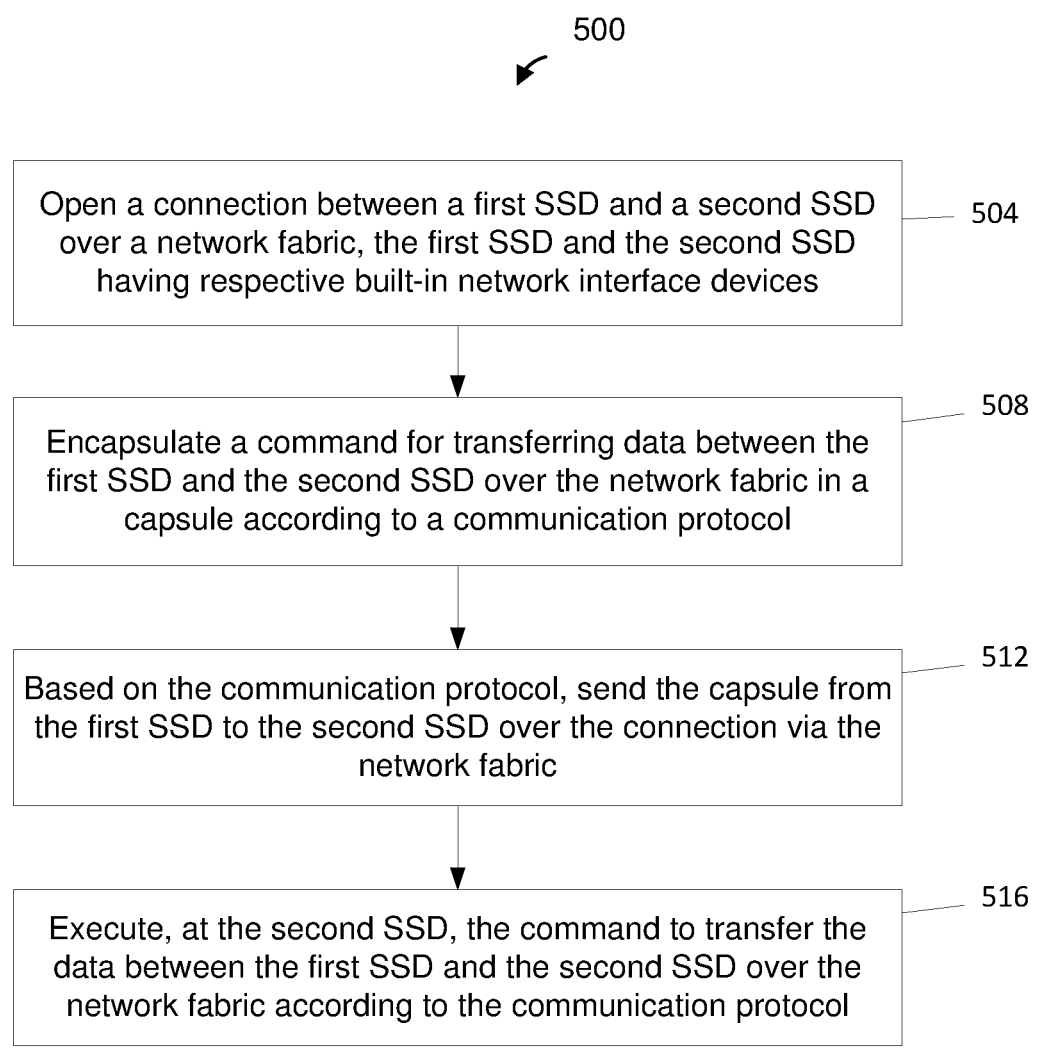
FIG. 5 is a flow diagram of an example method for transferring data between SSDs with respective built-in network interface devices over a connection between the SSDs, according to an embodiment.

FIG. 5 is a flow diagram of an example method 500 for transferring data between a first SSD and a second SSD via a network fabric, according to an embodiment. The first SSD comprises a first built-in network interface device configured to communicate via the network fabric, and the second SSD comprises a second built-in network interface device configured to communicate via the network fabric, according to an embodiment. In various embodiments, the method 500 involves transferring data between the first SSD and the second SSD via a network fabric without first transmitting any of the data to a host computer. For example, in some embodiments, the first SSD and the second SSD are communicatively coupled to a host computer via the network fabric, and the method 500 involves transferring data between the first SSD and the second SSD via the network fabric without first transmitting any of the data to the host computer.

The method 500 is implemented by the storage system 100 (FIG. 1), the storage system 200 (FIG. 2), or the storage system 300 (FIG. 3), in various embodiments, and the method 500 is described with reference to one or more of FIGS. 1-3 for ease of explanation. In other embodiments, the method 500 is implemented by another suitable storage system that includes SSDs with respective built-in network interface devices configured to communicate via a network fabric, and which is configured to transfer data between SSDs via the network fabric without first transmitting any of the data to a host computer.

At block 504, the first SSD opens a connection with the second SSD via the network fabric. In an embodiment, opening the connection at block 504 comprises a first processor (e.g., the processor 128 of FIG. 1) of the first SSD opening the connection. In an embodiment, opening the connection at block 504 comprises opening the connection according to a communication protocol for communicating with non-volatile memory devices. In an embodiment, opening the connection at block 504 comprises opening a connection that does not include a host computer (e.g., the host computer 102).

In an embodiment, opening the connection at block 504 comprises opening the connection according to the NVMe-oF communication protocol. In various other embodiments, opening the connection at block 504 additionally or alternatively comprises opening the connection according to one or more of i) the Fibre Channel communication protocol, ii) the RDMA communication protocol, iii) the InfiniB and communication protocol, iv) NVMeTCP communication protocol, etc.

In some embodiments, opening the connection at block 504 comprises the first built-in network interface device of the first SSD transmitting one or more first packets to the second built-in network interface device of the second SSD via the network fabric, the first packets including information corresponding to opening the connection according to the communication protocol for communicating with non-volatile memory devices. In some embodiments, opening the connection at block 504 additionally comprises the first built-in network interface device of the first SSD receiving one or more second packets from the second built-in network interface device of the second SSD via the network fabric, the second packets including information corresponding to opening the connection according to the communication protocol for communicating with non-volatile memory devices. In some embodiments, information in the second packets is responsive to information in the first packets.

In an embodiment, a host computer is communicatively coupled to the first SSD and the second SSD via an interconnect (e.g., the interconnect 114), and opening the connection at block 504 comprises opening a connection via the interconnect, wherein the connection does not include the host computer.

At block 508, the first SSD encapsulates a command for transferring data between the first SSD and the second SSD over the network fabric in a capsule according to a communication protocol for communicating with non-volatile memory devices. In an embodiment, encapsulating the command at block 508 comprises encapsulating an NVMe command for transferring data to or from an SSD. In an embodiment, encapsulating the command at block 508 comprises encapsulating the command according to the NVMe-oF communication protocol. In various other embodiments, encapsulating the command at block 508 additionally or alternatively comprises encapsulating the command according to one or more of i) the Fibre Channel communication protocol, ii) the RDMA communication protocol, iii) the InfiniB and communication protocol, iv) NVMeTCP communication protocol, etc.

At block 512, the first SSD sends the capsule to the second SSD over the connection via the network fabric according to the communication protocol. In an embodiment, the network fabric comprises an Ethernet switch, and sending the capsule at block 512 comprises sending the capsule in an Ethernet packet over the connection via the Ethernet switch. For example, the first network interface device of the first SSD comprises a first Ethernet network interface device (e.g., the Ethernet network interface device 136); the first Ethernet network interface device encapsulates the capsule in an Ethernet packet and transmits the Ethernet packet to the Ethernet switch; and the Ethernet switch forwards the Ethernet packet to the second SSD. In an embodiment, the second network interface device of the second SSD comprises a second Ethernet network interface device (e.g., the Ethernet network interface device 150), and the second Ethernet network interface device decapsulates the capsule from the Ethernet packet and provides the capsule to a processor (e.g., the processor 152) of the second SSD to execute the command in the capsule.

In another embodiment, the network fabric comprises a Fibre Channel (FC) switch, and sending the capsule at block 512 comprises sending the capsule in an FC frame over the connection via the FC switch. For example, the first network interface device of the first SSD comprises a first FC network interface device; the first FC network interface device encapsulates the capsule in an FC frame and transmits the FC frame to the FC switch; and the FC switch forwards the FC frame to the second SSD. In an embodiment, the second network interface device of the second SSD comprises a second FC network interface device, and the second FC network interface device decapsulates the capsule from the FC frame and provides the capsule to a processor (e.g., the processor 152) of the second SSD to execute the command in the capsule.

In another embodiment, the network fabric comprises an InfiniBand switch, and sending the capsule at block 512 comprises sending the capsule in an InfiniBand packet over the connection via the InfiniBand switch. For example, the first network interface device of the first SSD comprises a first InfiniBand network interface device; the first InfiniB and network interface device encapsulates the capsule in an InfiniBand packet and transmits the InfiniBand packet to the InfiniBand switch; and the InfiniBand switch forwards the InfiniBand packet to the second SSD. In an embodiment, the second network interface device of the second SSD comprises a second InfiniBand network interface device, and the second InfiniBand network interface device decapsulates the capsule from the InfiniBand packet and provides the capsule to a processor (e.g., the processor 152) of the second SSD to execute the command in the capsule.

At block 516, the second SSD executes the command to transfer data between the first SSD and the second SSD over the network fabric according to the communication protocol. Executing the command to transfer data at block 516 comprises executing an NVMe command in the capsule to transfer data between the first SSD and the second SSD. In an embodiment, Executing the command to transfer data at block 516 comprises transferring data between the first SSD and the second SSD without transferring any of the data to a host computer.

In an embodiment, executing the command to transfer data at block 516 comprises copying from the first SSD to the second SSD via the network fabric. In an embodiment, executing the command to transfer data at block 516 comprises retrieving from the second SSD and transmitting the retrieved data to the first SSD via the network fabric.

The connection between SSDs described above may additionally or alternatively be used for other purposes other than transferring data between SSDs as described above. For example, the connection may allow Ethernet enabled SSDs, FC enabled SSDs, InfiniBand enabled SSDs, etc., to manage operation of the SSDs such as a data rate which each SSD is to use when communicating with the host 102. In examples, one SSD may act as a master and sends respective capsule(s) that specify respective data rate(s) that other SSDs (slaves) are to use when communicating with the host. The host may be capable of communicating at a data rate such as 25 Gbps, as an illustrative example. The master SSD may specify a percentage (or fraction) of the host's data rate (e.g., a percentage or fraction specified by a number ranging from 0 to 1). So that the host's data rate is divided fairly or appropriately, the master may specify respective percentages or fractions of the host's data rate at which the respective SSDs are to communicate with the host 102. The master may indicate the percentage/fraction of the data rate via a capsule sent over a connection between the master and a slave. Further, the master may adjust this percentage/fraction as a number of slave SSDs serving the host 102 change or demands of a particular slave SSD change. The connection between SSDs may be used to exchange other information for other suitable purposes as well.

Embodiment 1

A method for transferring data between a first solid state drive (SSD) and a second SSD, the first SSD having a first built-in network interface device configured to communicate via a network fabric, and the second SSD having a second built-in network interface device configured to communicate via the network fabric, the method comprising: opening a connection between the first SSD and the second SSD over a network fabric; based on a non-volatile memory over fabric (NVMe-oF) communication protocol, encapsulating in a capsule an NVMe command to transfer data between the first SSD and the second SSD over the connection; sending the capsule from the first SSD to the second SSD over the connection via the network fabric; and executing, by the second SSD, the NVMe command in the capsule to transfer the data between the first SSD and the second SSD over the connection.

Embodiment 2

The method of embodiment 1, wherein: the network fabric comprises an Ethernet switch; the method further comprises: encapsulating, at the first built-in network interface device of the first SSD, the capsule in an Ethernet packet, and decapsulating, at the second built-in network interface device of the second SSD, the capsule from the Ethernet packet; and sending the capsule from the first SSD to the second SSD comprises sending the capsule in the Ethernet packet via the Ethernet switch.

Embodiment 3

The method of embodiment 1, wherein opening the connection comprises opening the connection according to one of i) the Fibre Channel communication protocol, ii) the remote data memory access (RDMA) communication protocol, iii) the InfiniBand communication protocol, or iv) the NVMe over Transmission Control Protocol (NVMeTCP) communication protocol.

Embodiment 4

The method of any of embodiments 1-3, wherein: opening the connection between the first SSD and the second SSD further comprises opening the connection further over an interconnect associated with a host computer; opening the connection between the first SSD and the second SSD comprises opening a connection that does not include the host computer; and executing the NVMe command in the capsule to transfer the data between the first SSD and the second SSD comprises transferring data between the first SSD and the second SSD without transferring any of the data to the host computer.

Embodiment 5

The method of any of embodiments 1-4, wherein the transfer of the data comprises copying or retrieving the data over the connection between the first SSD and the second SSD.

Embodiment 6

The method of any of embodiments 1-5, wherein: opening the connection between the first SSD and the second SSD comprises opening a connection that does not include a host computer that is communicatively coupled to the first SSD and the second SSD; and executing the NVMe command in the capsule to transfer the data between the first SSD and the second SSD comprises transferring data between the first SSD and the second SSD without transferring any of the data to the host computer.

Embodiment 7

The method of any of embodiments 1-6, wherein opening the connection comprises an RDMA layer of the first Ethernet enabled SSD opening the connection in the network fabric with an RDMA layer of the second Ethernet enabled SSD Embodiment 8

The method of embodiment any of embodiments 1-7, wherein a host communicates with the first Ethernet enabled SSD and the second Ethernet enabled SSD at a data rate, the method further comprising the first Ethernet enabled SSD sending over the connection an indication of a fraction of the data rate which a second Ethernet enabled SSD communicates with the host.

Embodiment 9

The method of any of embodiments 1-8, wherein the network fabric is configured with TCP or Ethernet.

Embodiment 10

The method of any of embodiments 1-9, wherein sending the capsule from the first Ethernet enabled SSD to the second Ethernet enabled SSD over the connection comprises sending the capsule based on an IP address in the capsule of the second NVMe-oF SSD, the IP address indicating a destination of the capsule.

Embodiment 11

A storage system, comprising: a first solid state drive (SSD) having i) a first built-in network interface device configured to communicate via a network fabric, and ii) a first processor; a second SSD having i) a second built-in network interface device configured to communicate via the network fabric, and ii) a second processor; and the network fabric; wherein the first processor of the first SSD is configured to: i) open a connection between the first SSD and the second SSD over the fabric, the connection being over the network fabric, ii) based on a non-volatile memory over fabric (NVMe-oF) communication protocol, encapsulate in a capsule a non-volatile memory express (NVMe) command to transfer data between the first SSD and the second SSD over the connection, and iii) provide the capsule to the first built-in network interface device to send the capsule to the second built-in network interface device of the second SSD over the connection; and wherein the second processor of the second SSD is configured to: i) receive the capsule from the second built-in network interface device, ii) decapsulate the NVMe command from the capsule according to the NVMe-oF communication protocol, and iii) execute the NVMe command to transfer the data between the first SSD and the second SSD over the connection.

Embodiment 12

The storage system of embodiment 11, wherein: the first processor of the first SSD is configured to encapsulate the capsule in an Ethernet packet; the first built-in network interface device comprises a first Ethernet interface device configured to transmit the Ethernet packet; the network fabric comprises an Ethernet switch configured to forward the Ethernet packet to the second built-in network interface device of the second SSD; the second built-in network interface device comprises a second Ethernet interface device configured to provide the Ethernet packet to the second processor of the second SSD; and the second processor is configured to decapsulate the capsule from the Ethernet packet.

Embodiment 13

The storage system of embodiment 12, wherein: the first Ethernet interface device is communicatively coupled to the second Ethernet interface device further via an interconnect associated with a host computer; the first processor of the first SSD is configured to open the connection between the first SSD and the second SSD further over the interconnect; and the first processor is configured to open a connection between the first SSD and the second SSD comprises that does not include the host computer; and the Ethernet switch is configured to direct Ethernet packets between the first SSD and the second SSD without transmitting packets to the host computer.

Embodiment 14

The storage system of any of embodiments 11-13, wherein the first processor of the first SSD is configured to open the connection according to one of: i) a Fibre Channel communication protocol, ii) a remote data memory access (RDMA) communication protocol, iii) an InfiniB and communication protocol, or iv) an NVMe over Transmission Control Protocol (NVMeTCP) communication protocol.

Embodiment 15

The storage system of any of embodiments 11-14, wherein the network fabric is configured to transfer the data between the first SSD and the second SSD without transferring any of the data to a host computer communicatively coupled to the first SSD and the second SSD.

Embodiment 16

The storage system of embodiment 15, wherein: the host computer is configured to communicate with the first SSD and the second SSD via the network fabric at a first data rate; the first processor of the first SSD is configured to send over the connection an indication of a second data rate at which the second SSD is to communicate with the host computer over the network fabric; and the second data rate is a fraction of the first data rate.

Embodiment 17

The storage system of any of embodiments 11-16, wherein the network fabric comprises an Ethernet switch.

Embodiment 18

The storage system of embodiment 17, wherein: the first processor of the first SSD is configured to encapsulate the capsule in an Ethernet packet with a network address of the second SSD; the first built-in network interface device comprises a first Ethernet interface device configured to transmit the Ethernet packet to the Ethernet switch; the Ethernet switch is configured to use the network address of the second SSD in the Ethernet packet to forward the Ethernet packet to the second built-in network interface device; the second built-in network interface device comprises a second Ethernet interface device configured to provide the Ethernet packet to the second processor of the second SSD.

Embodiment 19

The storage system of any of embodiments 11-18, wherein the transfer of the data comprises copying or retrieving the data over the connection between the first SSD and the second SSD.

Embodiment 20

The storage system of any of embodiments 11-19, wherein: the first processor of the first SSD is configured to implement a first Remote Direct Memory Access (RDMA) communication protocol layer; the second processor of the second SSD is configured to implement a second RDMA communication protocol layer; and the first RDMA communication protocol layer is configured to open the connection with the second RDMA communication protocol layer.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:
1. A method for transferring data between a first solid state drive (SSD) and a second SSD, the first SSD having a first built-in network interface device configured to communicate via a network fabric, and the second SSD having a second built-in network interface device configured to communicate via the network fabric, the method comprising:

opening a connection between the first SSD and the second SSD over a network fabric;
based on a non-volatile memory over fabric (NVMe-oF) communication protocol, encapsulating in a capsule an NVMe command to transfer data between the first SSD and the second SSD over the connection;
sending the capsule from the first SSD to the second SSD over the connection via the network fabric;
executing, by the second SSD, the NVMe command in the capsule to transfer the data between the first SSD and the second SSD over the connection; and
sending to the second SSD, by the first SSD over the network fabric, an indication of a data rate that the second SSD is to use when communicating with a host computer that is communicatively coupled to the network fabric.

2. The method of claim 1, wherein:
the network fabric comprises an Ethernet switch;
the method further comprises:
  encapsulating, at the first built-in network interface device of the first SSD, the capsule in an Ethernet packet, and
  decapsulating, at the second built-in network interface device of the second SSD, the capsule from the Ethernet packet; and
sending the capsule from the first SSD to the second SSD comprises sending the capsule in the Ethernet packet via the Ethernet switch.

3. The method of claim 1, wherein opening the connection comprises opening the connection according to one of i) the Fibre Channel communication protocol, ii) the remote data memory access (RDMA) communication protocol, iii) the InfiniBand communication protocol, or iv) the NVMe over Transmission Control Protocol (NVMeTCP) communication protocol.

4. The method of claim 1, wherein:
opening the connection between the first SSD and the second SSD further comprises opening the connection further over an interconnect associated with a host computer;
opening the connection between the first SSD and the second SSD comprises opening a connection that does not include the host computer; and
executing the NVMe command in the capsule to transfer the data between the first SSD and the second SSD comprises transferring data between the first SSD and the second SSD without transferring any of the data to the host computer.

5. The method of claim 1, wherein the transfer of the data comprises copying or retrieving the data over the connection between the first SSD and the second SSD.

6. The method of claim 1, wherein:
opening the connection between the first SSD and the second SSD comprises opening a connection that does not include the host computer that is communicatively coupled to the first SSD and the second SSD; and
executing the NVMe command in the capsule to transfer the data between the first SSD and the second SSD comprises transferring data between the first SSD and the second SSD without transferring any of the data to the host computer.

7. The method of claim 1, wherein opening the connection comprises an RDMA layer of the first SSD opening the connection in the network fabric with an RDMA layer of the second SSD.

8. The method of claim 1, wherein sending the indication of the data rate that the second SSD is to use when communicating with the host computer comprises sending an indication of a fraction of a host data rate that the host computer is capable of using.

9. The method of claim 1, wherein the network fabric is configured with TCP or Ethernet.

10. The method of claim 1, wherein sending the capsule from the first SSD to the second SSD over the connection comprises sending the capsule based on an IP address in the capsule of the second NVMe-oF SSD, the IP address indicating a destination of the capsule.

11. A storage system, comprising:
a first solid state drive (SSD) having i) a first built-in network interface device configured to communicate via a network fabric, and ii) a first processor;
a second SSD having i) a second built-in network interface device configured to communicate via the network fabric, and ii) a second processor; and
the network fabric;
wherein the first processor of the first SSD is configured to: i) open a connection between the first SSD and the second SSD over the fabric, the connection being over the network fabric, ii) based on a non-volatile memory over fabric (NVMe-oF) communication protocol, encapsulate in a capsule a non-volatile memory express (NVMe) command to transfer data between the first SSD and the second SSD over the connection, iii) provide the capsule to the first built-in network interface device to send the capsule to the second built-in network interface device of the second SSD over the connection, and iv) send to the second SSD, over the network fabric, an indication of a data rate that the second SSD is to use when communicating with a host computer that is communicatively coupled to the network fabric; and
wherein the second processor of the second SSD is configured to: i) receive the capsule from the second built-in network interface device, ii) decapsulate the NVMe command from the capsule according to the NVMe-oF communication protocol, and iii) execute the NVMe command to transfer the data between the first SSD and the second SSD over the connection.

12. The storage system of claim 11, wherein:
the first processor of the first SSD is configured to encapsulate the capsule in an Ethernet packet;
the first built-in network interface device comprises a first Ethernet interface device configured to transmit the Ethernet packet;
the network fabric comprises an Ethernet switch configured to forward the Ethernet packet to the second built-in network interface device of the second SSD;
the second built-in network interface device comprises a second Ethernet interface device configured to provide the Ethernet packet to the second processor of the second SSD; and
the second processor is configured to decapsulate the capsule from the Ethernet packet.

13. The storage system of claim 12, wherein:
the first Ethernet interface device is communicatively coupled to the second Ethernet interface device further via an interconnect associated with the host computer;
the first processor of the first SSD is configured to open the connection between the first SSD and the second SSD further over the interconnect; and
the first processor is configured to open a connection between the first SSD and the second SSD comprises that does not include the host computer; and the Ethernet switch is configured to direct Ethernet packets between the first SSD and the second SSD without transmitting packets to the host computer.

14. The storage system of claim 11, wherein the first processor of the first SSD is configured to open the connection according to one of: i) a Fibre Channel communication protocol, ii) a remote data memory access (RDMA) communication protocol, iii) an InfiniB and communication protocol, or iv) an NVMe over Transmission Control Protocol (NVMeTCP) communication protocol.

15. The storage system of claim 11, wherein the network fabric is configured to transfer the data between the first SSD and the second SSD without transferring any of the data to the host computer communicatively coupled to the first SSD and the second SSD.

16. The storage system of claim 15, wherein:
the host computer is configured to communicate with the first SSD and the second SSD via the network fabric at a host data rate;
the first processor of the first SSD is configured to send the indication of the data rate that the second SSD is to use when communicating with the host computer as an indication of a fraction of the host data rate.

17. The storage system of claim 11, wherein the network fabric comprises an Ethernet switch.

18. The storage system of claim 17, wherein:
the first processor of the first SSD is configured to encapsulate the capsule in an Ethernet packet with a network address of the second SSD;
the first built-in network interface device comprises a first Ethernet interface device configured to transmit the Ethernet packet to the Ethernet switch;
the Ethernet switch is configured to use the network address of the second SSD in the Ethernet packet to forward the Ethernet packet to the second built-in network interface device; and
the second built-in network interface device comprises a second Ethernet interface device configured to provide the Ethernet packet to the second processor of the second SSD.

19. The storage system of claim 11, wherein the transfer of the data comprises copying or retrieving the data over the connection between the first SSD and the second SSD.

20. The storage system of claim 11, wherein:
the first processor of the first SSD is configured to implement a first Remote Direct Memory Access (RDMA) communication protocol layer;
the second processor of the second SSD is configured to implement a second RDMA communication protocol layer; and
the first RDMA communication protocol layer is configured to open the connection with the second RDMA communication protocol layer.

21. The method of claim 1, wherein sending the indication of the data rate that the second SSD is to use when communicating with the host computer comprises sending an indication of a percentage of a host data rate that the host computer is capable of using.

22. The storage system of claim 11, wherein:
the host computer is configured to communicate with the first SSD and the second SSD via the network fabric at a host data rate; and
the first processor of the first SSD is configured to send the indication of the data rate that the second SSD is to use when communicating with the host computer as an indication of a percentage of the host data rate.

* * * * *